United States Patent Office 3,801,604
Patented Apr. 2, 1974

---

3,801,604
PROCESS FOR PREPARING 3-ALKOXY-5-METHYL PHTHALIC ANHYDRIDES
Gerard Lang, 26 ter Avenue Jean-Jaures, 93 Epinay-sur-Seine, France
No Drawing. Filed Sept. 7, 1971, Ser. No. 178,421
Claims priority, application Luxembourg, Sept. 7, 1970, 61,654
Int. Cl. C07c 63/14
U.S. Cl. 260—346.6      6 Claims

ABSTRACT OF THE DISCLOSURE

In the disclosed process 3-alkoxy-5-methyl phthalic anhydrides of the formula:

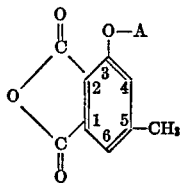

where A is a lower alkyl radical having 1 to 4 carbon atoms, are prepared in good yields by reacting a halogen-maleic anhydride with 1,1-dialkoxy-3-methyl butadiene in the presence of an inert anhydrous solvent. The 3-alkoxy-4-methyl phthalic anhydrides thus prepared are useful for the synthesis of anthraquinonic compounds.

BACKGROUND OF THE INVENTIONS

The present invention relates to the preparation of 3-alkoxy-5-methyl phthalic anhydrides in a direct manner and high yields.

The preparation of 1,3-diethoxy anthraquinone has been described by MacElvain et al. in J. Amer. Chem. Soc. 66, 1077 (1944), in a process wherein an excess of 1,1-diethoxyethylene or ketene diethyl acetal is reacted with 2-bromo-1,4-napthoquinone. Also 1,6-dihydro-3-ethoxy-5-methyl phthalic anhydride has been prepared by reaction of 1,1-diethoxy-3-methyl butadiene on maleic anhydride as described by S. M. MacElvain and L. R. Morris in J. Amer. Chem. Soc. 74, 2657 (1952).

The preparation of 3-alkoxy-5-methyl phthalic anhydrides in a direct manner and good yields has heretofore not been described.

DETAILED DESCRIPTION OF THE INVENTION

According to the present invention, a halogen-maleic anhydride is caused to react with 1,1-dialkoxy-3-methyl butadiene in the presence of an inert solvent to produce 3-alkoxy-5-methyl phthalic anhydrides.

More particularly it has now been discovered that 3-alkoxy-5-methyl phthalic anhydries of the formula:

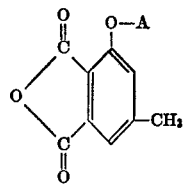

(I)

where A represents an alkyl group having from 1 to 4 carbon atoms, are prepared by reacting a halogen-maleic anhydride with 1,1-dialkoxy-3-methyl-butadiene of the formula:

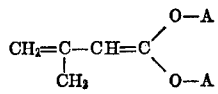

(II)

where A again represents a lower alkyl group having 1 to 4 carbon atoms, as mentioned above. The reaction occurs generally according to the following equation:

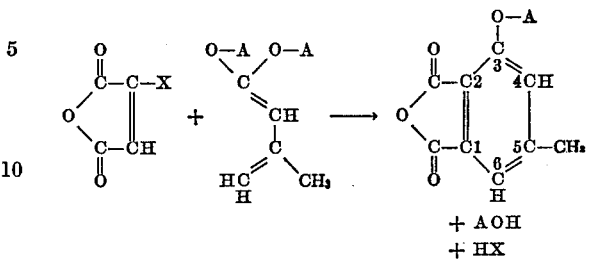

$+$ AOH
$+$ HX

In this reaction A represents a lower alkyl group having 1 to 4 carbon atoms and X is a halogen atom. The reaction is carried out in the presence of a suitable inert, anhydrous solvent having a low boiling point, of the order of about 30° C. to 120° C. at a reflux or preferably ambient temperature, although temperatures as low as about 26° C. and as high as about 80° C. may be applied. One mole of alkanol A—OH and one mole of hydrolhalic acid HX are formed during the course of the reaction. The reactants are preferably present in the reaction mixture in equi-molar amounts.

After substantial completion of the reaction, the reaction mixture is allowed to stand and the 3-alkoxy-5-methyl phthalic anhydride product is separated in the form of a precipitate which is then recrystallized in a suitable solvent or solvents in a known manner. In the disclosed process and using correct practice, yields of the order of 50% and greater of phthalic anhydrides carrying an alkoxy substituent in the 3 position and a methyl group in the 5 position are achieved, all without undesirable secondary reactions.

As the 1,1-dialkoxy-3-methyl-butadiene there may be used any lower 1,1-dialkoxy-3-methyl butadiene having 1 to 4 carbon atoms such as 1,1-dimethoxy-3-methyl-butadiene; 1,1-diethoxy-3-methyl-butadiene, 1,1 - dipropoxy-3-methyl butadiene, and 1,1-dibutoxy-3-methyl butadiene. As the halogen, identified in the above general reaction as X, fluorine, chlorine and bromine may be present on the maleic anhydride.

The reaction is preferably conducted, for reasons of convenience and economy, at atmospheric pressure, although higher and lower pressures may be applied. The reaction solvent is any suitable anhydrous solvent that has a low boiling point and does not react with the reactants to give undesirable side products. Reaction solvents include, by way of example, anhydrous petroleum ether, benzene, sulfuric ether, isopropyl ether and toluene, and the like. Mixtures of two or more of the above solvents also may be used. Solvents for recrystallization of the 3-alkoxy-5-methyl phthalic anhydrides produced according to the invention will be readily apparent and include, by way of example, acetone, benzene, toluene and ligroine, and the like as well as mixtures of two or more solvents.

The 3-alkoxy-5-methyl phthalic anhydrides produced according to the process of the present invention are useful as intermediates for the synthesis of anthraquinonic compounds.

The following are non-limiting examples to illustrate preferred embodiments of the invention. Unless otherwise indicated all parts and percentages are by weight.

Example.—Preparation of 3-ethoxy-5-methyl phthalic anhydride

In a vessel equipped with a dropping funnel, a stirrer and a reflux coolant, there was introduced chloromaleic anhydride (0.02 mole) in anhydrous petroleum ether (10 ml.). Dropwise with stirring 1,1-diethoxy-3-methylbutadiene (0.02 mole) was added while the reaction mixture was maintained at about 25° C. for 120 minutes. Upon completion the reaction mixture was allowed to stand for 12 hours at ambient temperature, the precipitate obtained was separated by draining and recrystallizing in acetone. The 3-ethoxy-5-methyl phthalic anhydride is obtained in the form of fine amber needles in a yield of 50%. The results of the analysis were as follows:

Analysis.—$C_{11}H_{10}O_4$: Calculated (percent): C, 64.07; H, 4.89. Found (percent): C, 64.13; H, 4.66.

In a similar manner and using the proportions of reactants and reaction conditions of the previous example, 1,1-dibutoxy-3-methyl butadiene is reacted with chloromaleic anhydride in an anhydrous solvent to produce 3-butoxy-5-methyl phthalic anhydride.

Using the procedure and amounts of reactants as in the example, chloromaleic anhydride is reacted with 1,1-dimethoxy-3-methyl butadiene in the presence of an anhydrous solvent to produce 3-methoxy-5-methyl phthalic anhydride.

I claim:

1. A process for the preparation of 3-alkoxy-5-methyl phthalic anhydride of the formula:

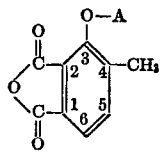

wherein A is alkyl having 1 to 4 carbon atoms comprising
(a) reacting a halogen-substituted maleic anhydride of the formula:

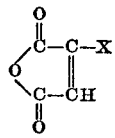

wherein X is a halogen atom, with 1,1-dialkoxy-3-methyl butadiene of the formula:

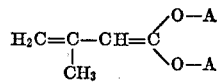

wherein A has the significance given above, at a temperature of about 30° C. to about 120° C. in the presence of an anhydrous non-reactive solvent having a boiling point of the order of about 30 to 120° C., and (b) separating the 3,5-dialkoxy phthalic anhydride thus produced from the reaction mixture.

2. The process of claim 1 wherein the molar ratio of halogen-substituted maleic anhydride to 1,1-dialkoxy-3-methyl butadiene is about 1:1.

3. The process of claim 1 wherein the reaction is conducted at ambient temperatures and in the absence of heating the reaction mixture.

4. The process of claim 1 wherein the anhydrous non-reactive solvent is selected from the group consisting of anhydrous petroleum ether, benzene, sulfuric ether, isopropyl ether and toluene.

5. The process of claim 1 including the additional step of:
(c) recrystallizing the 3-alkoxy-5-methyl phthalic anhydride separated in step (b) in acetone as a solvent.

6. The process of claim 1 wherein the halogen-substituted maleic anhydride is chloromaleic anhydride and the 1,1-dialkoxy-3-methyl butadiene is 1,1-diethoxy-3-methly butadiene.

References Cited

UNITED STATES PATENTS 2,391,226    12/1945    Clifford et al. _____ 260—346.6

OTHER REFERENCES

McElvain et al., J. Amer. Chem. Soc. (1952), vol. 74, pp. 2657–62.

DONALD G. DAUS, Primary Examiner

B. DENTZ, Assistant Examiner

U.S. Cl. X.R.

260—383, 615 R

UNITED STATES PATENT OFFICE
CERTIFICATE OF CORRECTION

Patent No. 3,801,604      Dated April 2, 1974

Inventor(s) Gerard Lang

It is certified that error appears in the above-identified patent and that said Letters Patent are hereby corrected as shown below:

In the heading, column 1, after line 6, insert the following:

-- Societe Anonyme dite:
L'Oreal, Paris, France,
a French Company      --.

Signed and sealed this 24th day of September 1974.

(SEAL)
Attest:

McCOY M. GIBSON JR.
Attesting Officer

C. MARSHALL DANN
Commissioner of Patents